Patented Aug. 30, 1932

1,874,170

UNITED STATES PATENT OFFICE

CLOYD M. CHAPMAN, OF DOUGLASTON, NEW YORK

PROCESS FOR BONDING CEMENT AND GYPSUM

No Drawing.  Application filed January 28, 1928. Serial No. 250,341.

My invention relates to the application of coatings composed in whole or in part of cement to surfaces of structural units or portions of structures composed in whole or in part of gypsum, and to the application of coatings containing gypsum to surfaces of structural units or portions of structures containing cement and has for its object the providing of an adequate bond between the two materials.

Great difficulty has been experienced in the past in applying a coating of mortar in which cement constitutes the active cementing material to a structure built of gypsum or a material in which gypsum or plaster of Paris constitutes the active cementing material.

It is a common practice in present day building construction to form partitions, walls, floors, roofs and ceilings of gypsum or of mixtures of materials in which gypsum is the active constituent which causes the mixture to set and harden after the product is formed. In many cases partitions, floors or other portions of a structure are composed of structural units of material composed wholly or partially of calcined gypsum, commonly called "gypsum" or "stucco," which have been manufactured in a factory and are commonly known as "precast units." In other cases, particularly in floors and roofs, the gypsum mixture is mixed with water at the site of the structure and poured into forms and allowed to harden in place in the floor or roof of the building. Such construction is commonly known as "poured-in-place" construction to distinguish it from the precast unit construction described above.

In both of these classes of construction it is frequently desired to apply to one or more of the surfaces a coating of mortar or plaster composed wholly or in part of Portland or other cement. But cement will not bond with gypsum and all efforts to apply a cement mortar or plaster to gypsum block or to gypsum floors or roofs have met with failure because of the very weak adhesion of the cement to the gypsum with the result that in time the cement mortar or plaster scales off or comes loose.

There are many conditions under which it is highly desirable to apply cement or cement mortar directly to gypsum. If cement mortar could be depended upon to adhere firmly and permanently to gypsum it would be possible to construct the outside walls of buildings of gypsum and then cover the outside surface of the gypsum wall with a coating of cement stucco to protect it from the disintegrating and damaging effects of weather exposure.

Gypsum absorbs water very greedily and is not, of itself, considered a suitable material for the construction of outside walls exposed to the action of the weather, but such walls, properly protected from the elements by a firmly adhering coat of cement mortar would successfully withstand the effects of even severe climatic conditions.

Another example of conditions under which it is desirable to be able to firmly bond cement mixtures to gypsum is in the case of a gypsum floor over which a wearing course or layer of some sort is to be placed. When the rough floor is finished and ready for the reception of the wearing course, it must be brought to a smooth, even, level surface by the application of some sort of surfacing material. If a cement mortar could be applied in a manner which would insure its having a strong, firm bond with the underlying gypsum floor, there would result a finished surface which would be hard, smooth, wear-resisting and suitable for the reception of linoleum, cork, carpet, rug, or other form of floor covering.

When the structural unit is composed of cement concrete or cement mortar or when the portion of the structure is composed of concrete or cement mortar and it is desired to apply thereto a plaster or mortar in which gypsum is the cementing constituent, it is just as essential that there be a firm, tenacious bond between the two materials. Structures, walls, partitions, roofs, etc. are frequently built of concrete building blocks, brick or slabs, or the structure may be of concrete poured in place, and it is frequently desired to apply a coating of gypsum plaster directly to the surface of the structure. In either case it is essential that there be a firm, permanent bond between the structure and the coating and my new process makes such a bond possible of attainment.

To accomplish this desirable result I have discovered that, by suitable treatment of the surface of the gypsum or of the concrete or by suitable treatment of the cement or the cement mortar which is to be applied to the gypsum, or of the gypsum mortar to be applied to concrete, I can produce a bond between the two materials which is so strong and tenacious that, when broken apart by force or shock, they will not separate at the bond but will break apart either in the gypsum portion or in the cement portion depending upon which is the weaker of the two.

In my co-pending applications, Serial Nos. 242,301 and 246,906, I have described two methods of securing this bond, the first of which is a chemical method involving the treatment of the surface of the gypsum with a chemical solution, and the other of which involves the preparation of the surface of the gypsum by incorporating in it, while the gypsum is still plastic before it has set, a powdery or granular material which will bond strongly with the gypsum and to which in turn cement will firmly adhere.

I find that there is a third method of producing this bond which consists in mixing with the cement or the cement mortar or mixture containing cement or with the gypsum or mixture containing gypsum, a chemical which has the desired bonding effect. I find that the chlorides which when applied to the surface of a material containing gypsum will cause it to bond firmly with cement or mixtures containing cement, may be added to the cement or to the mixture containing cement.

I find that when I add a chloride, as for example, calcium chloride, to cement or to a mixture containing cement, such for example as a cement-and-sand mortar or a cement concrete, and apply the mixture to the surface of gypsum, I get a firm, strong, tenacious bond between the gypsum and the cement mixture after the latter has set and hardened. The same is true when the chloride is added to a gypsum material which is to be applied to a surface containing cement.

In practice I usually dissolve the chloride in water and use the resulting solution in gauging the cement or mixture containing cement before applying it to the surface of the gypsum. But I find that it is not necessary to apply the chemical in the form of a solution. I find that some chlorides or substances containing chloride, as for example, "Cal," (which is a patented compound, containing hydrated lime and chloride of lime) may be mixed with the dry cement and thereafter this dry mixture of cement and chloride may be mixed with sand or other aggregate and gauged with fresh water and the resulting mortar or concrete be applied to the surface of gypsum and that a satisfactory bond is thereby secured. I follow the same procedure in preparing a material containing gypsum for application to a surface containing cement.

I find that a number of chemicals can be used to impart to the applied cement or gypsum the desired bonding quality. Chlorides are particularly suitable but to somewhat varying degree. Some chlorides have a detrimental effect upon the quality of cement, its hardness and strength after setting. Such chlorides should not be used for the purpose of securing a bond to gypsum. Sodium chloride, common salt, is an example of such a chloride. Other chlorides have a hardening and accelerating effect upon cement and its setting qualities and hasten the time of set to a marked degree. Calcium chloride is an example of such a chloride. I prefer calcium chloride for this reason and also on account of its cheapness and general availability. As to the strength of the solutions used in gauging cement or gypsum mixtures to produce a suitable bond, or the amount of chlorides added to cement to produce a mixture which when wet will produce a suitable bond, I find that if cement or gypsum mixtures are gauged with water in which has been dissolved from one-half to four pounds of calcium chloride or corresponding quantities of other chlorides to each gallon of water used, the resulting mixture will bond firmly and tenaciously to the surface to which it is applied. While these qualities represent reasonable limits for the strength of the solution, I find in practice that from one to two pounds of calcium chloride per gallon of gauging water to be a very satisfactory strength.

When the bonding agent is mixed in the dry form with the cement or gypsum, I find that the use of equivalent amounts to give satisfactory results.

Having described my invention in a manner enabling one skilled in the art to use it, I now state what I deem as new and novel and on which I pray that Letters Patent may be granted.

1. The process of producing a bond between a material containing hydraulic gypsum and a material containing cement, one of which materials is applied in a plastic state to the other after it has set and hardened, which consists in mixing between one quarter per cent. and ten per cent. of a chloride with the material which is applied in a plastic state before applying it.

2. The process of producing a bond between a material containing gypsum and a material containing hydraulic cement, one of which materials is applied in a plastic state to the other after it has set and hardened, which consists in mixing between one quarter per cent. and ten per cent. of calcium chloride with the material which is applied in a plastic state before applying it.

3. The process of producing a bond between a material composed largely of gypsum and a material composed largely of cement, one of which materials is applied in a plastic state to the other after it has set and hardened, which consists in mixing between one quarter per cent. and ten per cent. of a chloride with the material which is applied in a plastic state before applying it.

4. The process of producing a bond between a material composed largely of gypsum and a material composed largely of cement, one of which materials is applied in a plastic state to the other after it has set and hardened, which consists in mixing between one quarter per cent. and ten per cent. of calcium chloride with the material which is applied in a plastic state before applying it.

5. The process of producing a bond between a material containing gypsum and a material containing cement, one of which materials is applied in a plastic state to the other after it has set and hardened, which consists in mixing a material containing from one quarter per cent. to fifty per cent. of a chloride with the material which is applied in a plastic state before applying it.

6. That step in the process of bonding cement to gypsum which consists in adding a soluble chloride to the cement before applying the cement to the gypsum.

7. That step in the process of bonding cement to gypsum which consists in adding chloride of calcium to the cement before applying the cement to the gypsum.

8. That step in the process of bonding a mixture containing Portland cement to a mixture containing gypsum which consists in adding to the mixture containing cement, a solution of chloride before applying the cement to the gypsum.

9. That step in the process of bonding a mixture containing Portland cement to a mixture containing gypsum which consists in adding to the mixture containing cement a solution of a chloride in the proportion of from one-half pound to five pounds of chloride for each gallon of water used before applying the cement to the gypsum.

Signed at New York city, in the county of New York and State of New York this 27th day of January, A. D. 1928.

CLOYD M. CHAPMAN.